June 4, 1968  J. GUERNET  3,386,674
AUTOMATIC FILM OR TAPE REPRODUCING APPARATUS
Filed Aug. 27, 1965  8 Sheets-Sheet 1

INVENTOR
JACQUES GUERNET
BY
ATTORNEYS

June 4, 1968  J. GUERNET  3,386,674
AUTOMATIC FILM OR TAPE REPRODUCING APPARATUS
Filed Aug. 27, 1965  8 Sheets-Sheet 2

INVENTOR
JACQUES GUERNET
BY
ATTORNEYS

INVENTOR
JACQUES GUERNET
BY Darby & Darby
ATTORNEYS

June 4, 1968      J. GUERNET      3,386,674

AUTOMATIC FILM OR TAPE REPRODUCING APPARATUS

Filed Aug. 27, 1965      8 Sheets-Sheet 6

INVENTOR
JACQUES GUERNET

BY *Darby & Darby*

ATTORNEYS

June 4, 1968     J. GUERNET     3,386,674
AUTOMATIC FILM OR TAPE REPRODUCING APPARATUS
Filed Aug. 27, 1965     8 Sheets-Sheet 7

INVENTOR
JACQUES GUERNET

BY *Darby + Darby*

ATTORNEYS

June 4, 1968  J. GUERNET  3,386,674
AUTOMATIC FILM OR TAPE REPRODUCING APPARATUS
Filed Aug. 27, 1965  8 Sheets-Sheet 8

INVENTOR
JACQUES GUERNET

BY *Darby + Darby*

ATTORNEYS

United States Patent Office 3,386,674
Patented June 4, 1968

3,386,674
AUTOMATIC FILM OR TAPE REPRODUCING APPARATUS
Jacques Guernet, Courbevoie, France, assignor to Compagnie d'Applications Mecaniques A l'Atomistique (C.A.M.E.C.A.), Paris, France, a corporation of France
Filed Aug. 27, 1965, Ser. No. 483,192
Claims priority, application France, Sept. 18, 1964, 988,681
22 Claims. (Cl. 242—55.12)

ABSTRACT OF THE DISCLOSURE

An automatic device for the threading of film through a projector, the projecting of that film, and the rewinding of the film from the receiving or take-up reel to the supply reel. The machine is simple in construction and requires no magazines, but utilizes instead, simple reels of the normal type and requires that no manual operation be involved in the operation of the device other than the simple placing of a reel upon a spindle and the actuation of a switch. In the machine the film to be projected is provided with a clip at its outer end, which clip is fixed upon the flanges of the supply reel and is taken therefrom to the take-up reel by means of an arm pivotally mounted on the take-up reel, this arm likewise serving to return the clip to the supply reel after the film has been projected. Additionally, the machine is arranged to automatically rewind a film which has been projected during the projection of a second film so that substantially no time is lost between the projection of a series of films wound on separate reels. The device may also be employed for the recording and reproducing of magnetic tapes.

As indicated above, one of the most difficult problems in film projection is the automatic transfer of the end of the film from the supply reel to the take-up reel. A second problem is that of rewinding the projected film without interrupting the projection for an excessive length of time when a number of reels of film are to be projected in succession.

Another difficult problem consists in rewinding the projected film without thereby interrupting projection for an excessive length of time when a number of reels of film are to be projected in succession.

Many solutions to these problems have been proposed, especially in the similar case of mechanical pianos fitted with perforated strips which are wound onto spools, as well as in the case of magnetic tape recorders.

The present applicant has already proposed one solution in his patent application, U.S. application Ser. No. 386,146, filed July 27, 1964, now Patent No. 3,333,783.

The different known solutions do not provide entirely satisfactory results, especially if the device for the automatic attachment of the film to the receiving reel has to be combined with means for the automatic projection of a second film during the rewinding of the film which has just been projected, by reason of the fact that these means are either too complex or too cumbersome.

The automatic film projector in accordance with the present invention comprises means for projecting a film immediately after another film without awaiting the complete rewinding of the latter, so that said rewinding operation takes place during the projection of the following film and entails simple means of small overall size whereby the end of the film to be projected is transferred from the delivery to the receiving reel.

In effecting transfer from the delivery to the takeup reel a clip is utilized which is initially fixed to the delivery reel and which serves not only as a portion of the transfer mechanism but also as a means to retain the film end in position and thus facilitates storage.

It is an object of the invention to provide an automatic film or strip projector or reproducer which enables the film or strip to be reproduced and rewound automatically without any threading of the strip through the projection mechanisms and in fact with no manual operation other than the placing of the film delivery reel on its shaft.

It is another object of the invention to provide such an automatic film projector wherein a film is first located at a projection station and is subsequently transferred to a second station to thereby permit rewinding of a projected film while another film is being projected.

It is another object of the invention to provide means permitting the removal and replacement of a rewound film while another film continues to be projected thus providing for continuous, or substantially continuous, projection of a sequence of films.

It is another object of the invention to provide drive means engageable with the film reels at either the projection or rewind stations to drive these reels in the proper direction to effect the desired function.

It is a further object of the invention to provide a drive control means which causes interchange of the pairs of delivery and receiving reels from the projection to the rewinding stations at intervals dependent solely upon the length of the film strips.

It is a further object of the invention to provide a film clip which attaches to the delivery reel flanges and to which the outer end of the film is fixed thus retaining that end during storage and providing a means for transferring the film end to the corresponding take-up reel prior to projection and returning it to the delivery reel flange after rewinding.

It is a further object of the invention to provide a film clip with means for attaching the film or leader thereto so firmly that it is not necessary to wind a number of turns of film on the takeup reel at low speed in order to assure that no slippage occur.

It is a still further object of the invention to provide proper tension on all film reels during both projection and rewinding and to assure operation speeds proper for transfer, projection and rewinding.

It a still further object of the invention to utilize as a part of the film transfer mechanism a connecting arm which is pivotally mounted on the takeup reel and guided so that its end removes the film clip from the delivery reel flange and positions it on the take-up reel flange.

It is a still further object of the invention to provide means whereby the two film receiving reels are mounted on the same shaft in such manner that one reel operates in the porper direction for rewind while the other operates in the proper direction for projection, the drive being through frictional means.

Other objects and features of the invention will be apparent when the following description is considered in connection with the annexed drawngs, in which, FIGURE 1 is a top plan view, with certain housing elements omitted, of one embodiment of the device according to the invention;

FIGURES 8 and 9 show the mode of attachment of a film or strip to the flanges of the delivery reels;

Figure 7:
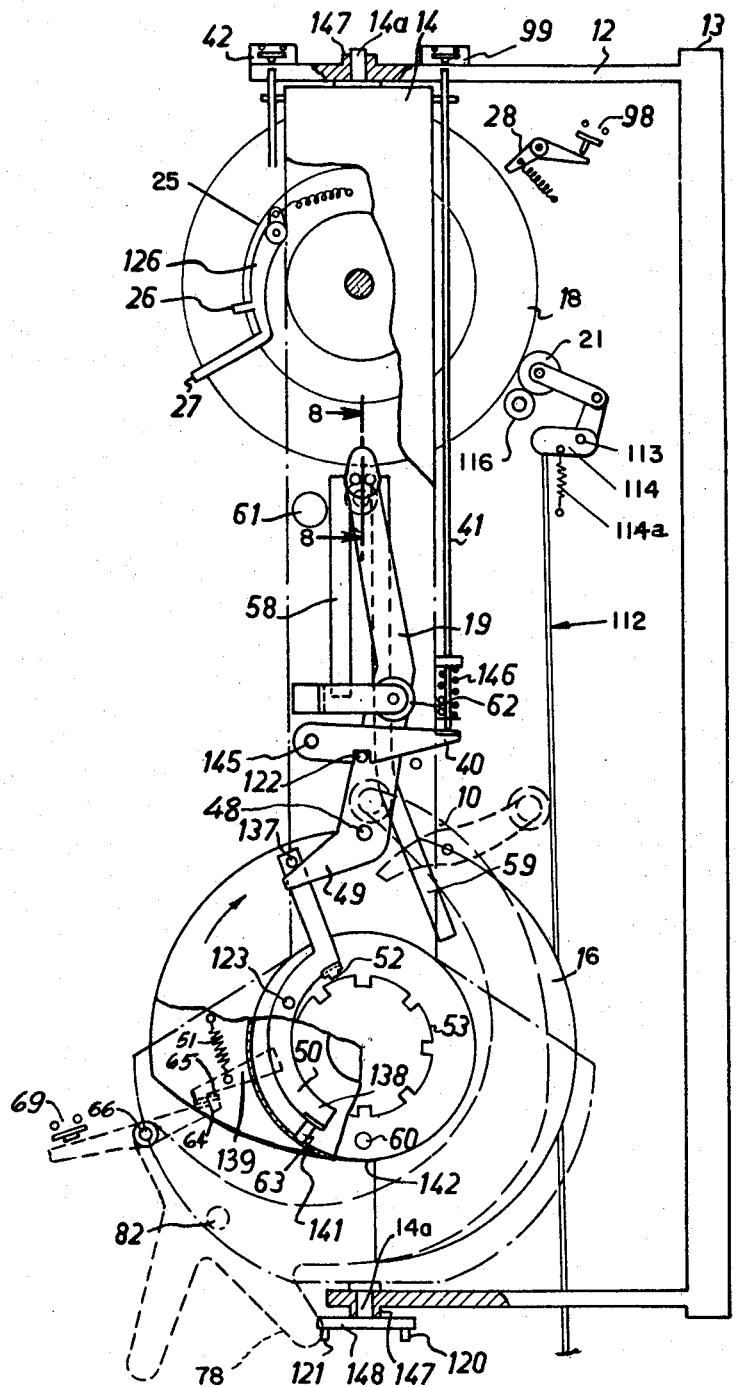
FIGURE 7 is a fragmentary sectional view taken along the line 7—7 of FIGURE 6.
Figure 10A:
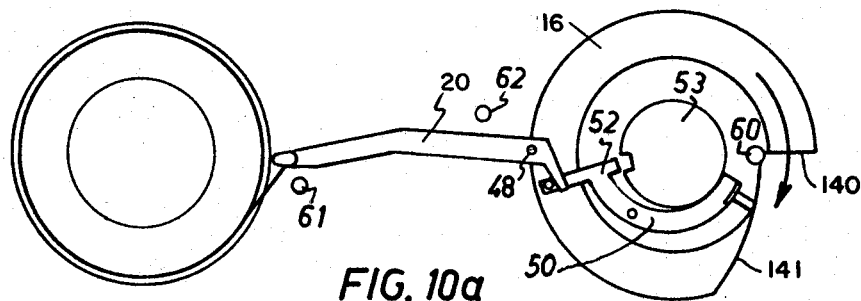
Figure 10B:
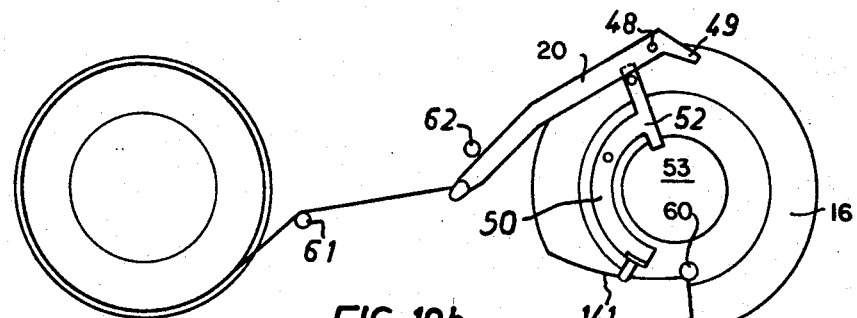
Figure 10C:
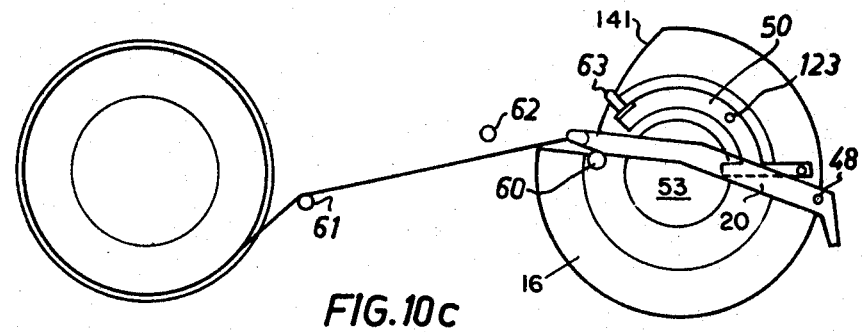
Figure 10D:
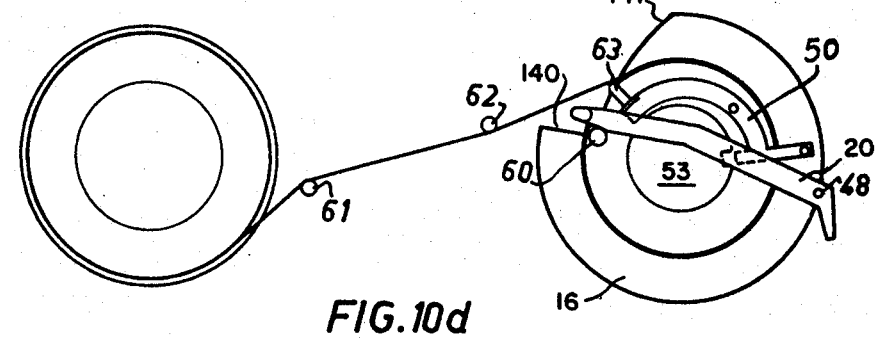
Figure 11:
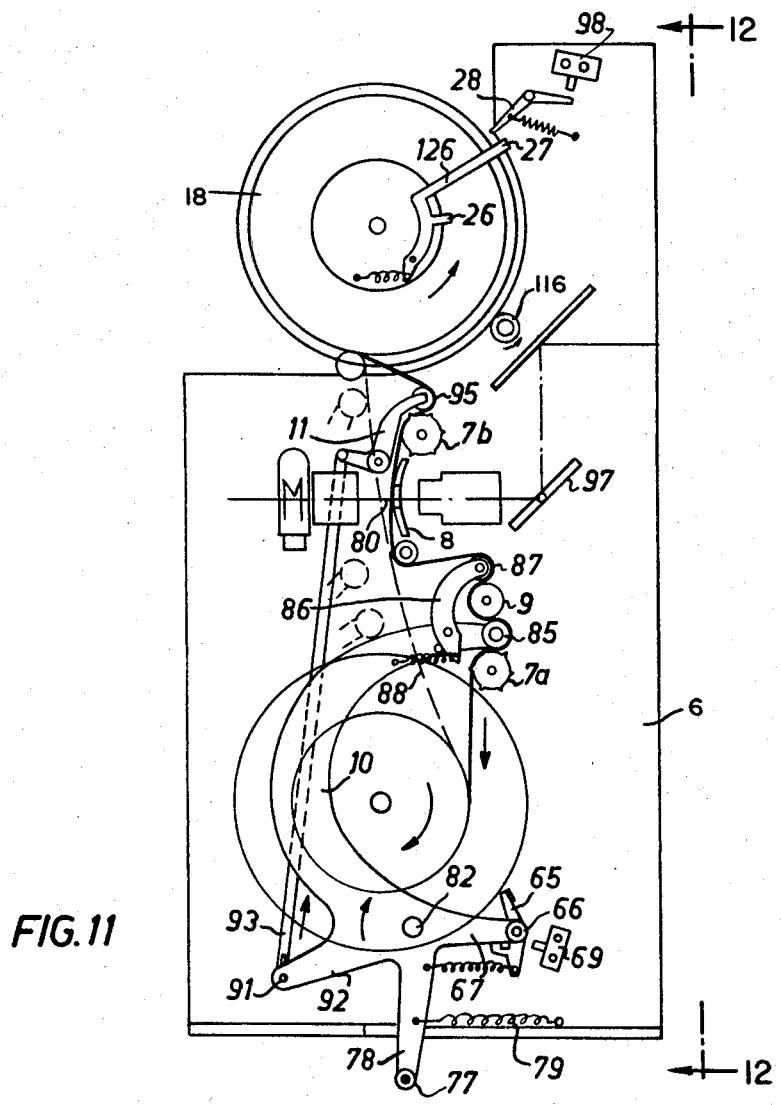
Figure 14:
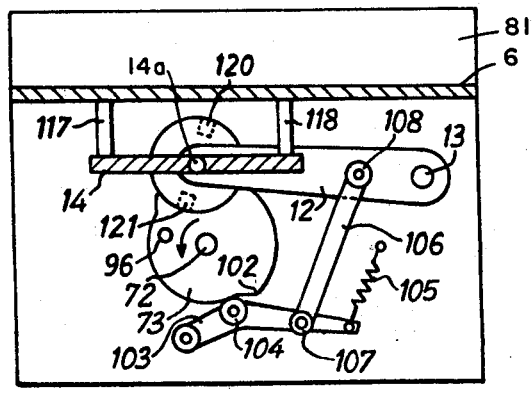
Figure 12:
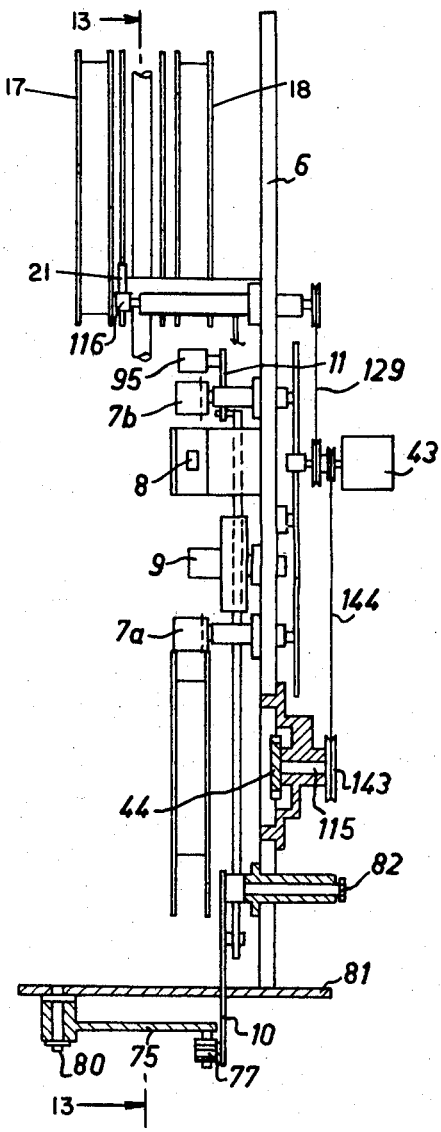
Figure 13:
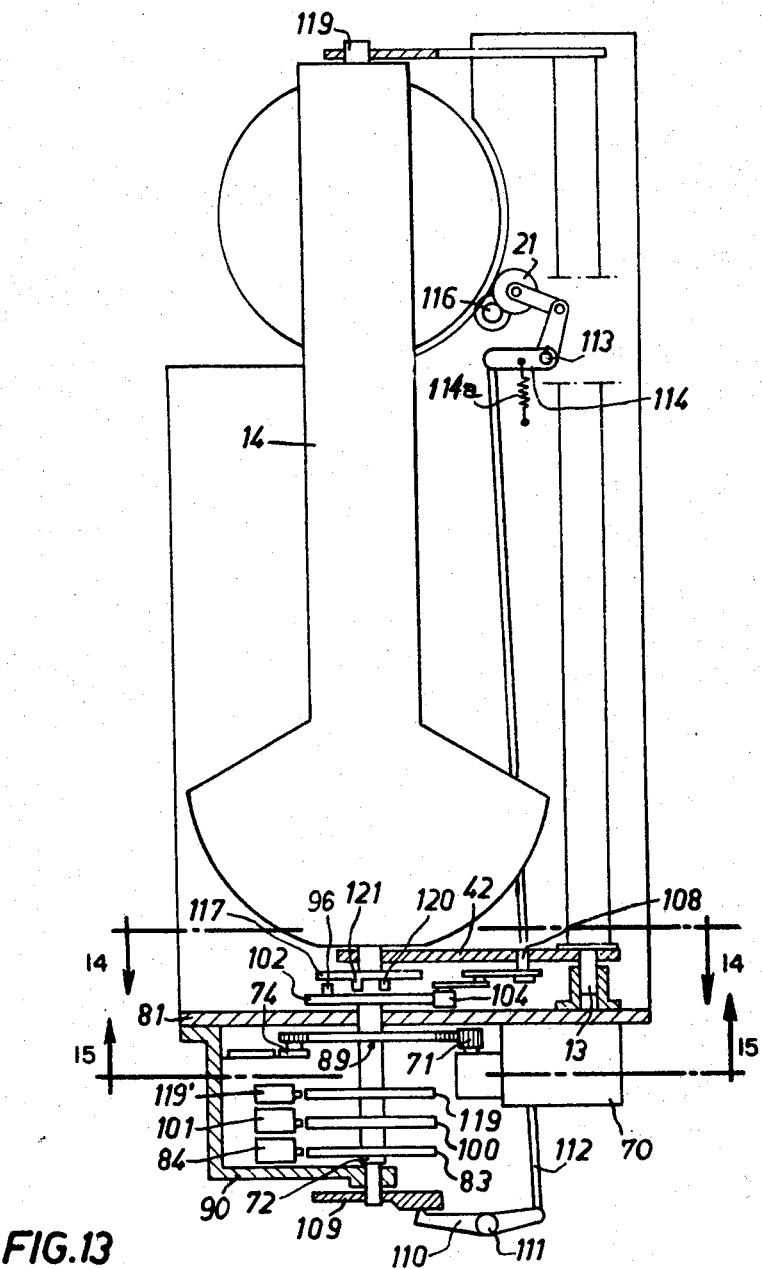

FIGURES 10a–10c form a set of diagrams illustrating the successive steps involved in transferring the end of the film from the delivery reel to the receiving reel;

FIGURE 11 is a partial view similar to FIGURE 7 but illustrating particularly the film positioning means;

FIGURE 12 is a view of the film positioning means taken along the line 12—12 of FIGURE 11, parts of the drive mechanism being in section, the film and optical elements being omitted in order to simplify the drawing;

FIGURE 13 is a representation of the station changing means with portions of the mechanism omitted for simplification. This view is on the line 13—13 of FIGURE 12;

FIGURE 14 is a view taken along the line 14—14 of FIGURE 13; and

Figure 15:
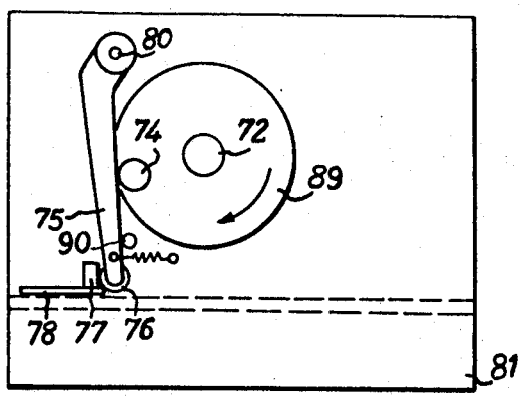

FIGURE 15 is a view taken along the line 15—15 of FIGURE 13.

Referring now to FIGURES 1 to 4, it can be seen that the device in accordance with the invention comprises projecting and rewinding means which are generally designated by the reference 1 together with a optical path which is in the form of a casing 2 in which the light beam emitted by the projection means is reflected from two mirrors 4 and 5 before impinging upon the screen 3. Placed within the housing 2 are a sound amplifier 24 and loudspeaker 23.

Generally speaking, it can be seen that the projection and rewinding means 1 consist of a fixed mounting plate 6 for supporting the film conveying mechanisms comprising the feed sprockets 7, the film guide or track 8 and the sound head 9 as well as a set of roller carrying levers 10 and 11 for the purpose of placing the film against the feed sprockets and the film track.

The projection device can be of any desired type. In the example which is illustrated in the drawings, said device is of the so-called continuous motion type.

Figure 3:
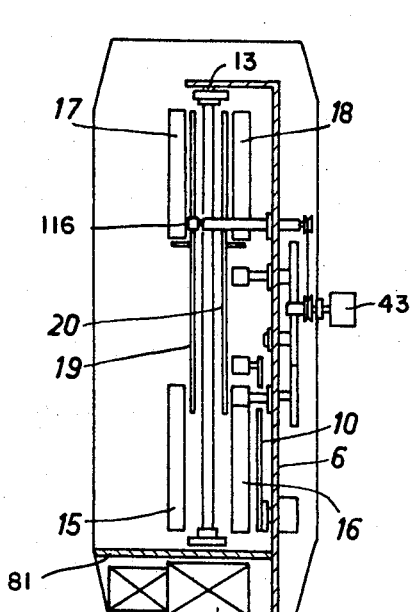
FIGURE 3 is a vertical cross sectional view taken along the line 3—3 of FIGURE 2.
Figure 4:
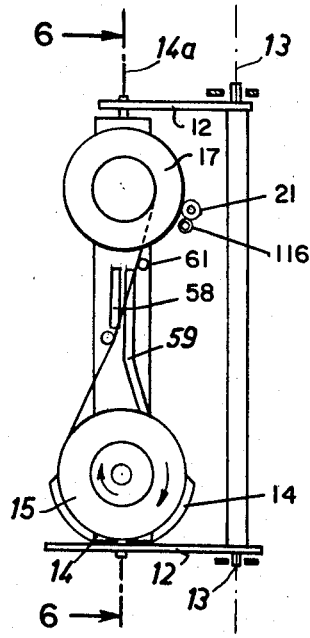
FIGURE 4 is a partial sectional view taken along the line 4—4 of FIGURE 1.

Referring more especially to FIGURES 3 and 4, it can be seen that the projection and rewinding means additionally comprise a pair of delivery reels 17 and 18 and a pair of receiving reels 15 and 16 which are carried by a plate 14 rotatably mounted in a cradle 12 which is in turn capable of pivoting through an angle α about a shaft 13.

Figure 5:
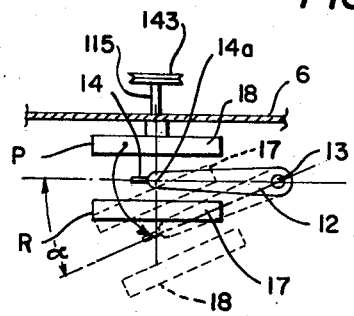
FIGURE 5 is a diagrammatic top plan view of FIGURE 4.

The apparatus comprises two stations (FIG. 5): a first station or so-called projection P wherein two reels 16 and 18 are located in the plane of projection and a second station R or so-called rewinding station. In order to transfer a pair of reels 15–17 or 16–18 from one station to the other, the cradle 12 performs a pivotal movement about its pivot pin 13 through an angle α as shown in FIGURE 5, whereupon the plate 14 rotates through an angle of 180° about its central axis 14a (FIG. 4), and the cradle 12 returns to its initial position.

The receiving reels 15 and 16 are each fitted with a transfer means for the purpose of transferring that end of the film which is lacted on the delivery reel to the hub of the receiving reel; said transfer means (FIG. 3) consists of a connecting arm 19 in the case of the reel 15 and a connecting arm 20 in the case of the reel 16.

By employing the above-mentioned transfer means which will be described in detail hereinafter, that end of the film which is located on the delivery reel at station P is brought onto the hub of the corresponding receiving reel.

The film which is thus held under tension between the two reels in the plane of projection is then applied against sprocket wheel units 7, film guide 8, and sound head 9 by the roller carrying levers 10 and 11.

Figure 1:
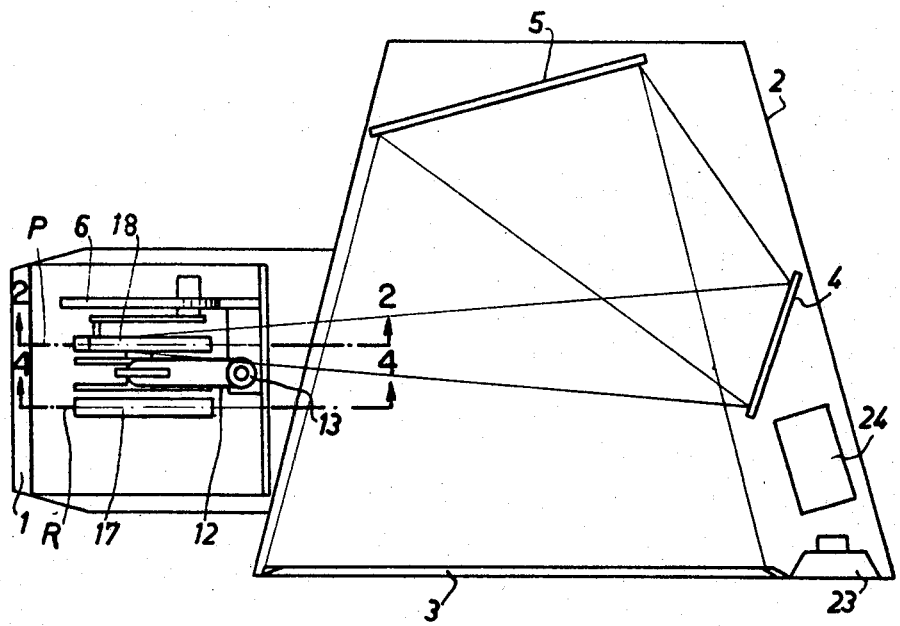
Figure 2:
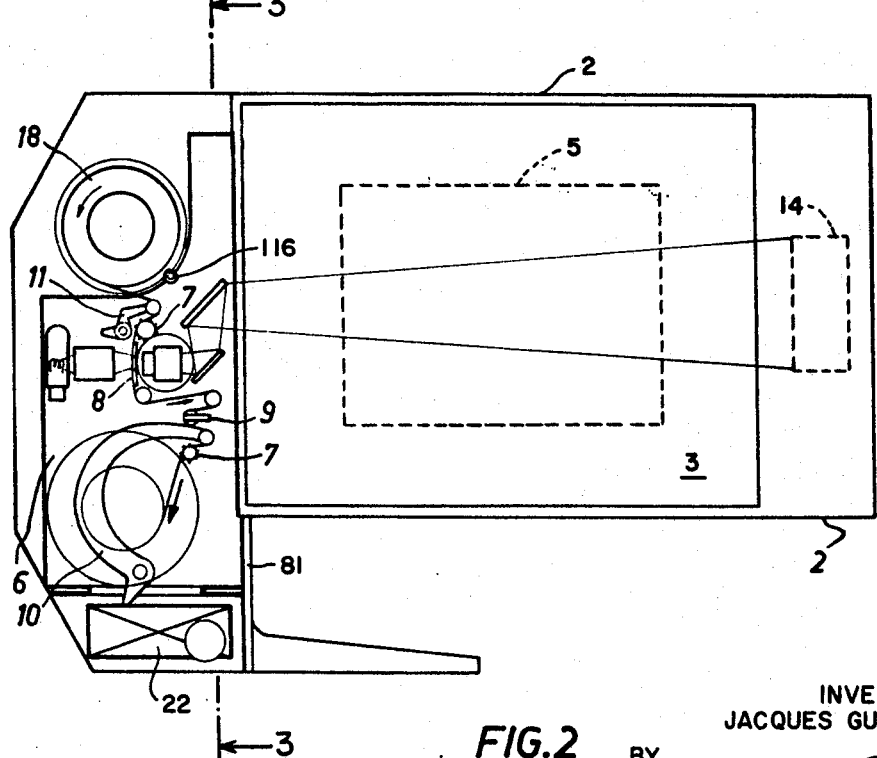
FIGURE 2 is a front elevational view partly in section taken along the line 2—2 of FIGURE 1.

The mounting plate 6 carries a rewinding device, the driving roller 116 of which is driven by the projection mechanism (FIGS. 2 and 13). A roller 21 is applied against the peripheral flange of roller 116 and thus drives by friction the delivery reel which is located at station R and effects the rewinding of the film on this reel during the projection of the film which is wound on the other delivery reel located at station P.

The different movements of the various components which have been briefly enumerated in the foregoing are operated in synchronism by means of an electromechanical device generally designated 22 (FIG. 3).

Figure 8:
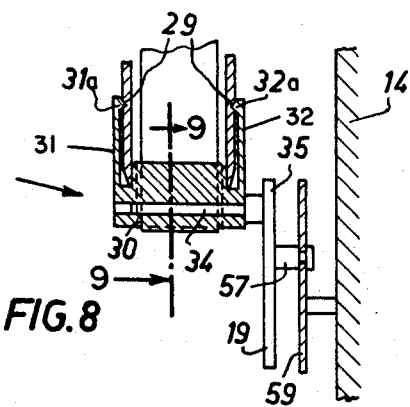
FIGURE 8 is a fragmentary cross sectional view taken on the plane of the line 8—8 of FIGURE 7.
Figure 6:
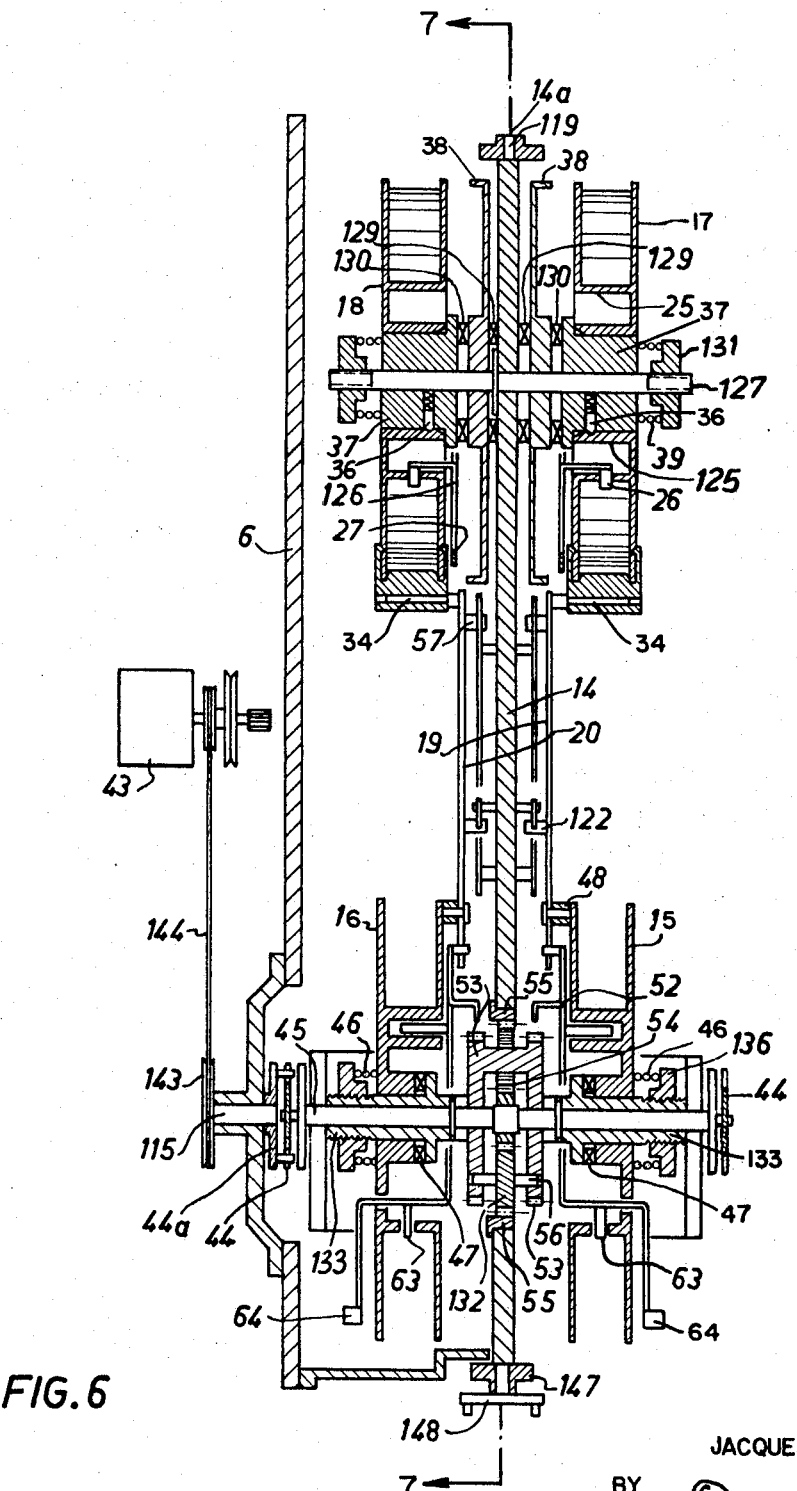
FIGURE 6 is a detailed sectional view of the device which is represented diagrammatically in FIGURE 4, the view being taken on the line 6—6 of FIGURE 4.

Referring now in greater detail to FIGURES 6, 7 and 8, it will be seen that each of the delivery reels 17 and 18 comprises an outer hub 25 onto which a film is wound and an inner hub 125 which is mounted on a bushing 37, said bushing being rotatably mounted on shaft 127.

It should be noted that since FIGURE 7 is a sectional view along the line 7—7 of FIGURE 6, the mounting plate 14 should be shown therein. However, as it would conceal a number of important components, said mounting plate has accordingly been shown as partially broken away at the top of the figure and then indicated in chain dotted lines.

Each of the reels 17 and 18 is provided with a pin 26 carried by a rocking lever 126 which is mounted on the reel (FIGS. 6 and 7). Said pin operates exactly as described in FIGURES 3 and 4 of U.S. patent application Ser. No. 386,146 and referred to above, viz: the inner turns of the film or strip end are provided with perforations through which the pin or projection 26 (FIGURES 6 and 7) is capable of passing; and when the film (or a special terminal end) no longer has any perforations, it presses against the pin 26, thus causing the lever 126 to swing back, the motion being opposed by a spring. Lever 126 is provided with a projection 27 as seen particularly in FIGURE 7.

When the film has unwound to a sufficient extent, the pin 26 projects through the hub 25 under the action of its spring and the projection 27 moves outwardly beyond the rim of the reel and, as the reel continues to rotate, the projection 27 engages with the rocking lever 28 which operates the switch 98.

Each of the side cheeks or flanges of the delivery reels 17 and 18 which serve to guide the film is provided with a circular groove 29 as shown in FIGURE 8.

Figure 9:
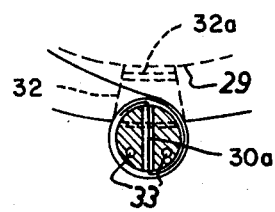
FIGURE 9 is a fragmentary cross sectional view taken on th plane of the line 9—9 of FIGURE 8.

The film which is secured at one end to the central hub is inserted at the other end in a slot 30a which is formed in the body of a clip 30 and then wound around the body as shown in FIGURE 9 to thus securely fix the film to the clip.

Said clip 30 is provided with two side members 31 and 32, prongs 31a and 32a of which engage in the circular grooves 29.

As is obvious, the clip 30 may be positioned at any point of the periphery of the reel, depending on the length of the film.

Two pins 34 which are disposed at the extremity of the connecting arm 20 (or 19) are adapted to extend into holes 33 which are formed in the clip 30.

The reel 17 or 18 is secured to the corresponding bushing 37 by means of a spring loaded pin 36 which is adapted to enter into a recess formed in the hub 125 (FIGURE 6).

There are successively mounted on each end of the shaft 127 which is fixed to the mounting plate 14; a friction disc 129, a pulley 38, a friction disc 130, the bushing 37, a spring 39 and a nut 131. Thus, the bushing 37 is coupled by friction to the pulley 38 which in turn frictionally bears against the fixed plate 14, the nuts 131 which compress the springs 39 being designed to individually regulate the degree of friction thus exerted.

The receiving reels 15 and 16 are mounted at the lower enlarged extremity of the mounting plate 14 on a shaft 45 (FIGURES 6 and 7). Said shaft 45 is carried by any suitable means on said movable plate 14, such means having been omitted from the figure for the sake of clarity.

Keyed to shaft 45 at its center is a pinion 54 which is adapted to engage with planetary pinion 132, these latter engaging with a ring gear 55 which is mounted on the plate 14 concentrically with the pinion 54.

The shafts 56 of the planetary pinions 132 are mounted at their ends in a spider formed by two plates 53, the peripheries of which are provided with a plurality of notches (see FIGURE 7).

On each side of the pinion 54 are fitted successively on the shaft 45 a flanged sleeve 133 which is keyed on the shaft 45, a friction disc 47, the hub of a receiving reel 15 or 16, a spring 46, a nut 136 and, at the shaft end, the female member 44 of a coupling of the dog-clutch type which is commonly referred to as an Oldham coupling.

The receiving reels 15 and 16 are therefore normally directly frictionally driven by the shaft 45, the degree of friction being regulated in respect of each reel by means of the corresponding spring 46, this latter being compressed between the nut 136 and the outer cheek of the reel considered.

Each receiving reel 15 and 16 carries a rocking lever 50 (FIGURE 7) which is pivoted to said reel by means of its fulcrum pin 123. One of the arms of said lever is provided with a stud 137 beneath which the lower end 49 of the transfer connecting arm 19 or 20 is adapted to engage; the lever 50 is further provided with a projection 52 (see also FIG. 6) which is capable of engaging one of the notches of one of the spider plates 53; another arm 138 carries a projection 63 which can project through the perforations formed either in the film or in its leader as wound onto the hub of the receiving reel 15 or 16; a last arm 139 is provided at its extremity with a pallet 64. Each of said two levers 50 extending between arm 139 and a fixed point on the reel is counteracted by a restoring spring 51.

Each reel 15 and 16 is provided on the inner flange thereof with a pivot-pin 48 on which is pivotally mounted the connecting-arm 19 or 20. In addition, the reel flanges mentioned are provided with a recess, one of the sides 140 of which extends radially outward from the inner hub of the reel at a point substantially diametrically opposite pin 48 whilst the other side is a circular arc 141 having the pivot-pin 48 as its center (see FIGS. 10a–10d).

A driving shaft 115 (FIG. 6) carried by the stationary mounting-plate 6 is disposed coaxially with the shaft 45, said shaft 115 being fitted at one end with the male portion 44a of the Oldham coupling and at the other end with a pulley 143 which is driven from a motor 43 by a transmission belt 144.

On each side of the movable plate 14, between the reels 15 and 17 or the reels 16 and 18 as the case may be are disposed two guide rails 58 and 59, two film guide rollers 61 and 62 and a lever 40 which is pivotally mounted on a pin 145 (FIG. 7).

Formed in each lever 40 is a notch in which a stud 122 carried by the connecting-arms 19 or 20 is engageable. The extremity of each lever 40 is in contact with a push-rod 41 which is counteracted by a spring 146.

When the above-mentioned push-rod 41 associated with the reels in the projection plane is lifted by the lever 40, said push-rod actuates a switch 42 carried by the cradle 12. In a similar manner the second push rod 41 associated with the reels at the rewinding station actuates a switch 99.

The mounting-plate 14 is rotatably mounted at its end in bearings 147 carried by the cradle 12. The lower extremity of the spindle 14a of said mounting-plate 14 has fixed thereto a plate 148 provided with two diametrically opposite downwardly extending studs 120 and 121 (FIG. 7).

Referring now to FIGS. 11 and 12, it can be seen that, between the reel 15 or 16 in the projecting position and the mounting-plate 6, there is disposed a sickle-shaped rocking-lever 10. Said sickle 10 is rotatably mounted on a fulcrum-pin 82 which is fixed with respect to the mounting-plate 6 and is biased in a counterclockwise direction by a spring 79. (By way of indication, said sickle is shown in broken lines in FIG. 7.)

For the sake of clarity of the drawings, only the essential components which were described in reference to FIGS. 6 and 7 have been illustrated again in FIGS. 11 and 12.

The above-mentioned sickle 10 is fitted at one of its tips with a roller 85 (FIG. 11) and a fulcrum-pin on which is pivotally mounted a rocking-lever 86 which is in turn fitted with a roller 87 at the extremity thereof, said rocking-lever 86 being acted upon by a spring 88.

There is fitted at the other tip of the sickle 10 a rocking-lever 65 which is pivotally mounted on a pin 66, said lever 65 being also acted upon by a spring.

The sickle has in addition two arms, namely an arm 78 at the end of which is fitted a roller 77 and an arm 92 at the end of which is provided a stud 91.

Said stud 91 is designed to project within an elongated slot formed at the lower end of a connecting-arm 93 which is pivotally coupled at the top end to an elbowed lever 11 which is in turn pivotally mounted on the plate 6 and which is provided at its extremity with a roller 95.

When the sickle 10 performs a pivotal movement about its pin 82, the rollers 85 and 87 apply the film against the sound head 9 and against the output sprocket-wheel 7a; at the end of travel, the stud 91 raises the connecting-arm 93, thus causing the lever 11 to swing over, and the roller 95 accordingly applies the film against the input sprocket-wheel 7b. As soon as the perforations of the films are engaged over the teeth of the sprockets, the inward thrust exerted by the roller 85 is compensated by the movement of withdrawal of the lever 86 while at the same time ensuring excellent film tension.

FIG. 13, 14 and 15 illustrate the electromagnetic means for control and synchronization.

A motor 70 (FIG. 13) or so-called cycle motor drives a gear-wheel 89 through the intermediary of a reduction-gear and a pinion 71. Said gear-wheel 89 is fixed on a camshaft 72 which is journalled in two bearings, one of which is carried by the plate 81 and the other by the bracket 90.

The shaft 72 carries above the plate 81 a cam 73 which is provided with a stud 96; the gear-wheel 89 is fitted with a roller 74; the cams 119, 100 and 83 which are carried by the shaft 72 produce action respectively on the switches 119′, 101 and 84; and finally, the shaft 72 is fitted with a cam 109.

The said cam 109 coacts with a rocker-arm 110 carried by a pin 111 and the extremity of said rocker-arm operates a rod 112 which bears on one of the extremities of a bell crank lever 114 which is urged counterclockwise by a spring 115 and which is provided at its other extremity with a binding roller 21.

Said roller 21 has a tendency, under the action of its restoring spring 114a, to bind or jam between a driving roller 116 (driven by the motor 43) and the rim of the pulley 38. The rod 112 withdraws the roller 21 during the changeover from one station to the other. Thus the pulley 38, driven by the rollers 116 and 21, drives by friction the delivery reel which is located at the re-winding station.

The operation of the device as described in the foregoing is as follows:

When the apparatus is loaded with delivery reels 17 and 18, that is when delivery reels 17 and 18 have been placed on hubs 37 with their clip holes 33 on pins 34 of connecting arms 19 and 20, the operator actuates the catch-lever 40 (shown in FIG. 7), thus releasing the stud 122 which locks the connecting-arm 20 and at the same time producing an upward thrust on the rod 41 which actuates the contact 99, thus starting the projection motor 43 (FIG. 12).

The projection motor drives the pulley 143 (FIG. 6) and the shaft 115 which in turn drives, through the Oldham coupling 44, the shaft 45 on which the two receiving reels 15 and 16 are frictionally mounted.

As the reel 16 commences to rotate (in the direction of the arrow as shown in FIGURE 7), the connecting-arm 20 is driven by the crank-pin 48.

The pins 34 (FIG. 8) which are integral with the extremity of the connecting-arm 20 pull the clip 30 away from the cheeks of the delivery reel, said clip being guided by the stud 57 which lies between the guide rails 58 and 59 (FIG. 7).

The heel 49 of the connecting-arm 20 releases the extremity 137 of the lever 50 and this latter pivots under the action of its spring 51. The extremity of the arm 52 of the lever 50 engages in one of the notches of the plate 53 (FIG. 7), the reel 16 being then positively coupled to said plate 53 which, by virtue of the epicyclic reduction-gear, rotates in the same direction as the shaft 45 but at a lower speed.

The connecting-arm 20 (or 19) which is drawn by the crank-pin 48 and guided by the guide rails 58 and 59 carries out the movement, the different stages of which are shown in FIG. 10. FIG. 10a shows the components prior to the commencement of the movement of rotation of the reel 15; FIG. 10b shows the lever 50 on completion of the swinging motion of this latter, in the position in which the reel 16 is accordingly driven at low speed, the end of the film which is wound on reel 18 being pulled by the connecting-arm 20, which is in turn driven by the crank-pin 48, the extremity of the connecting-arm 20 being guided by the rails 58 and 59 (which have not been shown in FIG. 10): FIG. 10c shows the positions of the components when thec rank-pin 48 has rotated through an angle which is slightly greater than 180°, te connecting-arm 20 being brought to bear against the stop 60 carried by the reel 16 while the film is applied against the roller 61; in FIG. 10d, it can be seen that, as the movement of rotation continues through an additional 360°, the film is wound onto the hub of the reel whilst the connecting-arm 20 is maintained by the tension of the film against the stop 60 and the film is stretched between the rollers 61 and 62; the rotation thus continues at a low speed as long as the film or its end-strip is provided with perforations.

When a sufficient number of turns (one turn is actually enough) have thus been wound at low speed, the film, which has no further perforations, depresses the catch 63. This causes the lever 50 to pivot, the end of the arm 52 is released from the plate 53 and the reel 16 is frictionally driven directly by the shaft 45.

At the same time, the extremity of the arm 64 of the lever 50 strikes against the rocking-lever 65 which is carried by the tip 67 of the sickle 10 (FIG. 7). Since said sickle is held by its spring 79, the lever 65 swings over and actuates the contact 69 which, by means of suitable relays, stops the projection motor 43 and starts up the cycle motor 70. The reel 16 stops and the film remains under tension between the rollers 61 and 62.

The motor 70 drives the camshaft 72 in the direction of the arrow (as shown in FIGS. 14 and 15) through the intermediary of the gear-wheel 89, this latter carries a roller 74 which thrusts back a lever 75 mounted on a pin 80 which is fixed to the plate 81 (as shown in FIGS. 12 and 15), there being mounted on the extremity of said lever a pin 76 which bears against the roller 77 located at the end of the arm 78 of the sickle 10.

Under the action of the lever 75, the sickle swings about its pivot-pin 82 and, through the intermediary of the rollers 85, 87 and 95, the sickle applies the film against the sound head 9, film track 8 and feed sprockets 7a and 7b.

The lever 65 which is mounted on the arm 67 of the sickle 10 moves away from the path described by the arm 64 of the lever 50 in order to prevent said lever 65 from being subsequently struck by the lever 50 at each revolution of the reel 15.

The cycle motor 70 stops when the cam 83 which is carried by the camshaft 72 actuates the contact 84 which at the same time starts up the projection motor 43.

The projection motor drives: the reel 16 through the intermediary of the friction disc 47 (FIG. 6); the feed sprocket 7a; the projection means proper which, in the example illustrated, comprise a rotary shutter and oscillating compensating mirror 97 (FIG. 11); the feed sprocket 7b, the frictionally mounted delivery reel 18 being unwound as a result of the film tension, the means for re-winding the delivery reel 17 being located at the re-winding station.

The film unwinds from the delivery reel 18 until the moment when the pin 26 passes through the perforations formed in the last turns of the film and causes the catch 27 to project on the side of said reel, said catch 27 being designed to actuate the contact 98 through the intermediary of the lever 28 (FIG. 11).

The contact 98 cuts off the supply to the projection lamp and sound amplifier, but allows the motor 43 to rotate while starting up the motor 70.

The gear-wheel 89 drives the roller 74 which permits the lever 75 as well as the sickle 10 to return under the action of the spring 79, the travel of the sickle 10 being limited by a stop 90 which immobilizes the lever 75 (as shown in FIG. 15).

The loops of film are then reabsorbed as a result of the rotation of the receiving reel 16 which is still frictionally driven by the shaft 45.

When the contact 101 is actuated by the cam 100 as shown in FIG. 13, the projection motor 43 comes to a stop.

The cam 109 which is located at the bottom portion of the shaft 72 operates the lever 110 which, by means of the rod 112, causes the lever 114 to swing over. The pivotal motion of the lever 114 withdraws the binding roller 21, with the result that the delivery reel 17 is no longer driven by the roller 116 and said roller 21.

At the same time, the cam 73 is driven by the shaft 72 in the direction indicated by the arrow in FIG. 14. Said cam 73 acts on the roller 104 carried by the lever 103; a restoring spring 105 maintains the roller 104 in contact with the cam 73.

The lever 103 is connected to the pivotal cradle 12 by means of a link-arm 106 which is pivotally attached at 107 and 108 to the lever 103 and to the cradle 12 respectively.

The lobe 102 of the cam 73 produces action on the roller 104, thereby producing a pivotal movement of the lever 103 which, through the intermediary of the link-arm 106, actuates the cradle 12 which accordingly pivots about its pin 13 through the angle α, thus actuating the moving plate 14 and the entire moving system thereof.

The shaft 45 of the receiving reels which was still driven by the shaft 115 is disengaged from the Oldham coupling 44.

When the cradle 12 has rotated through an angle α, the spindle 14a of the plate 148 is in alignment with the axis of the shaft 72 or, in other words, the plate 148 is concentric with the cam 73.

One of the two studs 120 or 121 of the plate 148 is then driven by the stud 96 of the cam plate 73 and the plate 148 is driven in rotation. Having moved through an angle of 180°, a second boss 102 which is symmetrical with the preceding allows the spring 105 to return the lever 103, thereby driving the cradle 12, the movement of which releases the stud 120 or 121 from the stud 96.

The mounting-plate 14 has performed a movement of rotation through an angle of 180° and the cradle 12 has returned to its initial position; after having performed one half revolution, the plate 14 comes to rest in a plane which is strictly determined by the keys 117 and 118 which are integral with the fixed plate 6 (FIG. 14).

The pair of reels 16 and 18, the film on which has been projected, are now located at the re-winding station R; the pair of reels 15 and 17 is located at the projection station P.

The cam 109 permits the lever 110 to swing over in the opposite direction, thereby permitting the spring 114a to move the roller 21 between the driving roller 116 and the pulley 38.

The cam 119 which operates the contact 121 accordingly initiates the stoppage of the cycle motor 70 and the starting-up of the projection motor 43 and winding of film on delivery reel 18.

If the lever 40 is actuated by the operator, the reel 15 is driven, the heel 49 of its transfer connecting-arm 19 releases the extremity 137 of its rocking lever 50 and a new projection cycle begins. At the same time, the re-winding of film on the delivery reel is carried out at station R.

The reel 16 is frictionally driven by the shaft 45 at the same time as the reel 15 but, by reason of the fact that said reel 16 has rotated through an angle of 180°, it accordingly rotates in a direction opposite to that in which it rotated at the time of its projection or, in other words, now rotates in the direction which is suitable for the re-winding thereof while being frictionally driven.

The delivery reel 18 is driven, also with friction, by the pulley 38 which is driven by the rollers 21 and 116.

The diameter of the roller 21 and of the rim of the pulley 38 are determined in such a manner that the tangential speed of the delivery reel as measured on the diameter of the hub 25 is higher than that of the receiving reel as measured on the maximum diameter of winding of film on this latter.

Under these conditions, the film is re-wound under a tension which is equal to the minimum tension which results from the frictional torque of the reels.

When the pin 63 passes through the perforations formed in the film or its end-strip, the spring 51 urges back the lever 50, the extremity 52 engages within a notch of the notched plate 53 and the reel 16 can accordingly only rotate at a low speed, the film being held under tension by virtue of the friction disc 130 of the delivery reel.

The dead turn or turns (depending on the number of perforations) of the films which are wound onto the hub of the receiving reel are wound off slowly as has been shown in FIGS. 10d, 10c, 10b and 10a.

The connecting-arm 20 now drawn by the film, moves away from the receiving reel, its stud 57 strikes against the guide rail 59, slides along said guide rail and then engages between said guide rail 59 and the guide rail 58.

That extremity which carries the clip 30 comes into abutting contact with the cheeks of the delivery reel 18 and, owing to the rigidity of the connecting-arm 20, this latter causes the clip 30 to engage the cheeks of the reel.

At the end of travel, the stud 122 engages the notch of catch-lever 40 and the heel 49 of the connecting-arm 20 lifts the extremity 137 of the lever 50 which thus swings over and disengages from the plate 55, thus disengaging the receiving reel.

The lever 40 actuates the push-rod 41 and the contact 42 which stops the projecting motor if the projection station is unoccupied; if said projection station is occupied, the motor 43 continues to rotate and the pulley 38 also continues to rotate but the delivery reel 18 remains motionless.

The operator can then remove the delivery reel 18 and replace it with another without interrupting the projection of the reel 17. When the film which is wound onto the reel 17 has finally been projected, the change of station will be carried out automatically and the projection of the new reel will also begin automatically, thereby securing a double advantage in that the only handling operation which the operator is called upon to perform consists in placing the delivery reel on its shaft (and in positioning it correctly so that the pins 34 pass into the holes 34 of the clip), this operation being performed during the projection of the film which is on the other reel, and that the interruption time between two projection stages is extremely short.

It can occur, however, that the lengths of film which are wound on the delivery reels are unequal to the extent that the projection stage is completed before the re-winding stage is completed.

In this case, since the connecting-arm 20 or 19 has not returned to its initial position, the contact 42 is not maintained by the rod 41 and the motor 43 accordingly continues to rotate.

If the contact 42 is not maintained, the cycle motor 70 stops when the cam 119 operates the contact 119' and the uncompleted re-winding operation continues under the action of the projection motor 43.

It will be readily apparent that the example hereinabove described has been given solely by way of example without any implied limitation of the invention. In particular, the invention is not limited to the projection of films.

In fact, the device according to the invention can also be employed for the recording and reproducing of magnetic tapes: it is merely necessary for this purpose to eliminate the image channel and to replace this latter by a recording head and erasing means, the device remaining otherwise virtually unchanged.

Moreover, the present invention can make it possible to produce a strip-feeding apparatus with a single station such as, for example, a magnetic-tape recorder, there being in the case employed only the transfer means consisting of the clip 30, connecting-arm 20, guide rails 58 and 59 and lever 50.

What is claimed is:

1. In a device for automatically feeding a tape to be reproduced from a flanged delivery reel to a flanged receiving reel and for returning said tape to said delivery reel after reproduction, in combination, a clip removably mounted on the delivery reel flanges and having means to hold the end of a tape wound on said reel, means for transferring said clip from the delivery reel to the receiving reel, said means comprising a connecting arm pivotally mounted on a flange of said receiving reel, and means for rotating said receiving reel to cause said arm to draw said clip from said delivery reel flanges and deposit it on the receiving reel.

2. A device as claimed in claim 1 wherein means are provided for connecting said clip to the end of said connecting arm most remote from its said piovtal mounting.

3. A device as claimed in claim 2 wherein said remote end of said arm is guided for movement along a predetermined path to the hub of said receiving reel, said guiding means comprising a pair of rails mounted in fixed position relative to said reels and a stud on said connecting arm extending between said rails.

4. A device in accordance with claim 3 wherein said delivery reel is rotatably mounted on a fixed shaft and wherein said clip connecting means comprises at least one rod extending parallel to the said delivery reel shaft adjacent the reel flange and means on said clip for engaging said rod as the reel is positioned on its shaft.

5. A device as claimed in claim 4 wherein said clip comprises a cylindrical body member, a pair of outwardly extending arms at each end of said cylindrical body, said arms being spaced apart substantially the distance between said reel flanges and resilient projections on the said arms adapted to engage portions of the reel flanges and wherein said clip connecting means comprises a pair of pins, and a pair of axial bores in said body adapted each to receive one of said pins.

6. A device in accordance with claim 1 wherein at least one of the flanges of said receiving reel is provided with a recess whereby as said reel rotates the remote end of said connecting arm may move into position to deposit said clip on the hub of said reel, continued rotation of said reel serving to wrap said tape about said hub each turn also passing over said clip.

7. A device as claimed in claim 6 wherein said receiving reel is provided with a stop located adjacent said recess substantially diametrically opposite said pivotal mounting, said stop serving to position said connecting arm with said clip at the end of said recess.

8. A device according to claim 6 wherein said recess is bounded by a circle arc struck from said pivotal mounting as a center and a line extending radially outwardly from said reel hub to the periphery of said reel flange at a point substantially diametrically opposite said pivotal mounting of said connecting arm.

9. A device in accordance with claim 1 wherein means are provided for rotating said receiving reel, said means including a friction disc and wherein friction means are provided to resist rotation of the delivery reel whereby the tape is tensioned as it is wound upon said receiving reel.

10. A device according to claim 9 wherein the delivery and receiving reels are mounted upon respective shafts and said friction means comprise friction discs mounted on said shafts in engagement with said reels.

11. In a device for automatically feeding a tape to be reproduced from a delivery reel to a receiving reel, reproducing material recorded on said tape and rewinding said tape on said delivery reel while a second tape is being fed from an associated delivery reel to its receiving reel and reproduced, in combination, two pair of delivery and receiving reels, the reels of each pair being located on parallel shafts with the axial centers of said reels in a common plane, the tape extending between reels of one pair lying in a plane containing the reproducer elements, the tape extending between the second pair of reels being in a plane for rewinding, a pair of shafts on which said reels are mounted with the delivery reels on one said shaft and the receiving reels on the other, a plate, means mounting said shafts on said plate, means comprising a connecting arm for transporting the end of a tape from the delivery reel in the reproducing plane to the corresponding receiving reel, means rotatably mounting said plate, means for rotating said plate when reproduction of a tape has been completed, to thereby interchange the planes of said tapes, and means for rewinding said tape upon said delivery reel subsequent to said interchange.

12. A device in accordance with claim 11 wherein said rotatable plate is mounted in an oscillatable cradle, said receiving reel shaft is rotatably mounted in said plate, said shaft is provided with a coupling means at each end thereof, a fixedly positioned cooperating coupling is mounted in alignment with the coupling member of the receiving reel for tape in the plane of reproduction, and means are provided for rotating said coupling whereby said receiving reel shaft is rotatably driven from either end thereof, said oscillation of said cradle and rotation of said plate serving to disengage said coupling, interchange said pairs of reels and engage said coupling at the opposite end of said shaft.

13. A device in accordance with claim 11 wherein said mounting plate is positioned between said reels and said reels of one pair face oppositely from those of the other whereby rotation of said shaft causes the receiving reels for a tape being reproduced to rotate in a predetermined direction and the reel for a tape being returned to its delivery reel to rotate in the direction opposite to the said predetermined direction.

14. A device in accordance with claim 10 wherein said drive means for said receiving reels comprises a planetary drive and wherein control means are provided to cause said reels to be driven directly or through said planetary drive, said control means including perforations in the tape.

15. A device in accordance with claim 12 wherein control means are provided for causing said cradle to move about its axis to disengage said receiving reel shaft coupling, said control means thereafter causing said plate to rotate through an angle of 180° to interchange said pairs of reels and said control means thereafter causing said cradle to return to its initial position.

16. A device in accordance with claim 11 wherein a rotatable shaft extends into position adjacent the delivery reel of the pair in rewinding position, said shaft having a roller thereon, and wherein said delivery reel shaft is fixedly positioned in said plate, a pulley is frictionally associated with each delivery reel and a rewinding idler roller is positioned to bear against said pulley of said delivery reel in rewinding position and against said shaft roller to thereby rewind a film from the receiving reel upon the delivery reel of a pair.

17. In a device for automatically transferring a tape from a deilvery reel to a receiving reel, in combination, a pair of parallel shafts one for each of said reels, said delivery reel shaft being fixed for rotation of said reel thereupon, said receiving reel shaft being rotatably mounted, said receiving reel being normally frictionally connected for rotation with said receiving reel shaft, a speed reduction means mounted on said shaft, means for driving said delivery reel from said speed reduction means, and control means operating to connect said receiving reel for drive from said speed reducing means, said control means comprising a lever pivotally mounted on said receiving reel, an arm on said lever, a pin on said arm, said pin projecting through the reel hub, and perforations in the tape end whereby said lever effects engagement of said reel with said speed reduction means in the presence of perforations in said tape end and effects release of said reel from said speed reduction means to permit frictional drive of said reel at shaft speed in the absence of perforations in said tape end.

18. In a device for automatically feeding a tape to be reproduced from a flanged delivery reel to a flanged receiving reel and for reproducing material recorded on said tape, in combination, a pair of parallel shafts, a delivery reel mounted on one of said shafts, a receiving reel mounted on the other thereof whereby a tape may extend therebetween, a reproducing system between the said shafts, drive sprockets also between said shafts in position to be engaged by said tape, a clip removably mounted on the delivery reel flanges and having means to hold the end of a tape wound on said reel, means for transferring said clip from the delivery reel to the receiving reel, said means comprising a connecting arm pivotally mounted on a flange of said receiving reel, and means on said arm engaging said clip, means for rotating said receiving reel to cause said clip to be drawn from said delivery reel and deposited on the hub of said receiving reel, a lever carrying a plurality of idler rollers, said lever being pivotally mounted in position to move the tape into position against said drive sprockets to cooperate with said reproducer and control means operable after deposit of said clip on said receiving reel hub to cause said lever to pivot about its pivotal mounting.

19. A clip for holding the outer end of a tape wound on a flanged reel in position on the reel flanges to assure that the tape will not unwind during storage and to adapt the tape to be automatically transferred from the reel to another reel for reproduction, said clip comprising a generally cylindrical body portion having an axial length substantially equal to the distance between the reel flanges, members extending radially outwardly from said body portion at the ends thereof, resilient arms extending inwardly from said members and adapted to engage peripheral grooves in the outer surfaces of the reel flanges, an axially extending diametrical slot in said body adapted to receive a tape end to be wrapped around said body member, and means in said body portion to receive a transfer means for removing said clip from a reel on which it is held by said resilient arms.

20. A device as claimed in claim 19 wherein said transfer receiving means comprises at least one axially extending bore in said cylindrical body member, said bore being open at at least one end thereof.

21. A device as claimed in claim 19 wherein said transfer receiving comprises a pair of axially extending bores in said cylindrical body portion, said bores lying on opposite sides of said diametrically extending slot, said bores being open at one end thereof.

22. In a device for automatically feeding a tape to be reproduced from a delivery reel to a receiving reel, reproducing material recorded on said tape and rewinding said tape on said delivery reel while a second tape is being fed from an associated delivery reel to its receiving reel and reproduced, in combination, two pair of reels each having a delivery and a receiving reel, the reels of each pair being located on parallel shafts with the axial centers of said reels in a common plane, the tape extending between reels of one pair lying in a plane containing reproducer elements, the tape extending between the second pair of reels being in a plane for rewinding, motor means for driving said receiving reel shaft, an oscillatable cradle, a plate, means rotatably mounting said plate in said cradle, means mounting said receiving and delivery reel shafts in said plate, means comprising a connecting arm for transferring the end of a tape from the delivery reel in the reproducing plane to the corresponding receiving reel, a reproducing guide member mounted between said delivery and receiving reels in the reproducing plane, drive means for said tape located adjacent said reproducing guide, said drive means being driven by said motor means, means for engaging a tape with said drive means, said engaging means comprising a lever carrying idler rollers engageable with the tape, a control motor, manually operable means for energizing said driving motor to cause a tape in the reproducing plane to be transferred to its receiving reel, means operable upon completion of winding of a predetermined number of tape turns on said receiving reel to energize said control motor, cam means actuated by said control motor for deenergizing said drive motor, additional cam means for actuating said lever to engage said idler rollers with the tape, further cam means for reenergizing said drive motor to thereby drive said tape during reproduction thereof and for deenergizing said control motor, means actuated under control of the tape for deenergizing said drive motor and reenergizing said control motor upon completion of reproduction, cam means operated by said control motor to deenergize said drive motor, pivot said cradle to disengage said receiving reel shaft from said drive motor, rotate said plate, and pivot said cradle in the opposite direction to reengage said receiving reel shaft with said drive motor and reenergize said drive motor to initiate said transfer of the end of a second tape from its delivery reel to its receiving reel, said cam means also serving to connect said drive motor to said first delivery reel to initiate rewinding of the tape thereon.

References Cited
UNITED STATES PATENTS

| | | | |
|---|---|---|---|
| 961,536 | 6/1910 | Roebuck | 352—125 |
| 1,245,755 | 11/1917 | Mehlfelder | 352—125 |
| 1,933,659 | 11/1933 | Curran | 242—74 X |
| 2,964,593 | 12/1960 | Kleve | 242—55.13 |
| 3,090,574 | 5/1963 | Doncaster et al. | 242—55.13 |
| 3,204,888 | 9/1965 | Bernat | 206—53 X |
| 3,306,545 | 2/1967 | Vogler et al. | 242—55.13 |

GEORGE F. MAUTZ, *Primary Examiner.*